No. 779,297. PATENTED JAN. 3, 1905.
S. E. LOVE & W. J. McRAE.
CLAMP FOR HANDLING METALLIC OR OTHER VESSELS.
APPLICATION FILED OCT. 9, 1903.
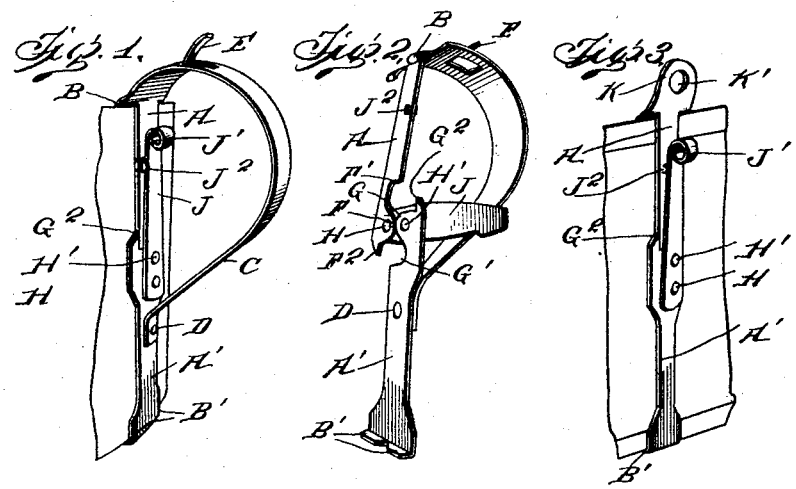
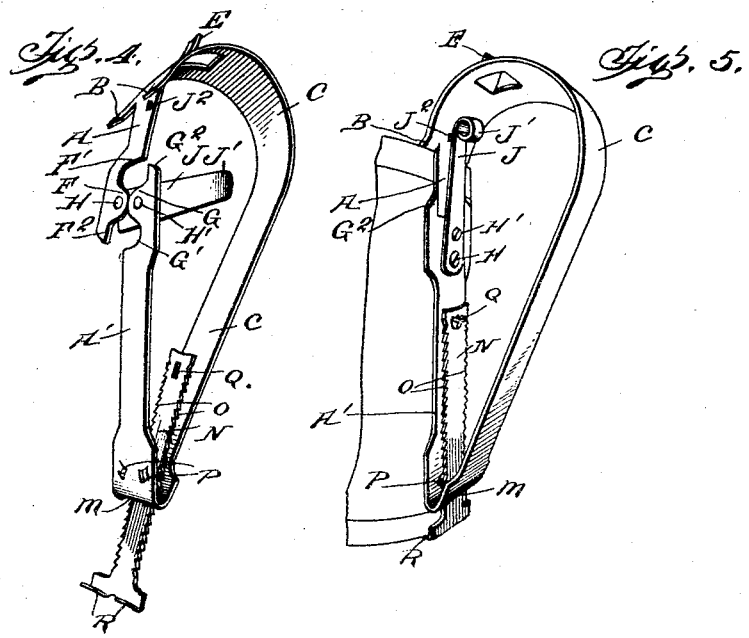

No. 779,297. Patented January 3, 1905.

UNITED STATES PATENT OFFICE.

SYDNEY ERNEST LOVE AND WILLIAM JOHN McRAE, OF GRE GRE VILLAGE, NEAR ST. ARNAUD, VICTORIA, AUSTRALIA.

CLAMP FOR HANDLING METALLIC OR OTHER VESSELS.

SPECIFICATION forming part of Letters Patent No. 779,297, dated January 3, 1905.

Application filed October 9, 1903. Serial No. 176,444.

*To all whom it may concern:*

Be it known that we, SYDNEY ERNEST LOVE and WILLIAM JOHN McRAE, subjects of the King of Great Britain and Ireland, residing at Gre Gre Village, near St. Arnaud, in the county of Kara-Kara, in the State of Victoria, but temporarily residing at the Lancefield Mine, Laverton, in the Mount Margaret Gold Fields District, in the State of Western Australia, and John Bull Creek via Gre Gre Village, near St. Arnaud, in the county of Kara-Kara, in the State of Victoria, Commonwealth of Australia, respectively, have invented certain new and useful Improvements in Clamps for Handling Metallic or other Vessels, of which the following is a specification.

The object of our invention is to provide a handle which can be attached to a discarded or used round, square, or other vessel, (which may once have contained jam, meat, fish, or other articles,) which handle shall render the said vessel capable of reuse for a variety of purposes; but in order that our invention may be better understood we will now refer to the accompanying sheet of drawings, which are to be taken as part of this specification and read herewith.

Figure 1 represents a handle clamped to the side of a vessel, portion of which vessel for convenience of illustration is removed. Fig. 2 shows the same handle, but the meeting ends of the clamping-bar are separated. Fig. 3 represents a clamp suitable for kerosene-tins. Fig. 4 shows a view of a handle having an extension-strip looked at from the clamping-face of it. Fig. 5 represents another view of the handle seen in Fig. 4.

Similar letters of reference indicate similar or corresponding parts where they occur in the several views.

On reference to the drawings, in Figs. 1 and 2 it will be seen that A is the upper clamping-bar, and A' the lower clamping-bar. At the top of A' are upper hooks or catches B. At the bottom of A are the lower catch or catches B'. Integral with the upper clamping-bar A is a handle C. The lower end of this by a rivet D is secured to the lower clamping-bar. Protruding upwardly above the top of the handle is a thumb-piece E, whereby a better control of the handle and the vessel is obtained. The meeting end of the upper clamping-bar A is provided with an upper tongue F and a pocket F'. It is also provided with a side stop $F^2$. The lower clamping-bar is provided with a lower tongue G and a pocket G'; also, a side stop $G^2$. In the upper clamping-bar A is a pivot-pin H, while in the lower one is a pivot-pin H'. These pivot-pins pass through the fastening-lever J, which lever is provided with a finger-piece J'. Protruding from the upper clamping-bar A is a fastening-lever stop $J^2$.

On reference to Fig. 3 it will be seen that the handle C is dispensed with and that in place thereof the upper portion of the clamping-bar is provided with an extension K, having a hole K' formed therein. This contains a piece of rope or other material or the hooked end of a bail or bucket-handle, and two clamping-bars (opposite each other) are applied, one each side of the vessel. The extension-strip, hereinafter described, may also be used by upturning the lower end of the lower clamping-bar and making a slot therethrough.

In Figs. 4 and 5 the upper and lower clamping-bars have their upper and lower ends united by the handle C, the said bars and handle being formed of one piece of material. Through the junction or bend of the lower portion of the handle C and lower clamping-bar A' is a slot M. Through this freely passes an extension-strip N. The extension-strip N can be of any length, and at each side of it are teeth or serrations O. This strip passes between two retaining-tongues P, which are forced outwardly from the metal forming the lower clamping-bar. The underneath portion of the teeth rest upon the top side edge of the tongues, and in order to prevent the said strip from falling through the slot M there is forced from it after it is in place a holding-tongue Q. At the bottom of the said extension is a catch or catches R.

To apply our handle when in the form shown in Figs. 1 and 2, it is only necessary to strain the lever into the position shown in Fig. 2 and then to hook the upper catches over the top edge of the vessel. The lower catches are then pushed under the vessel and the fastening-lever moved upwardly and past the stop $J^2$. It then reaches the position shown in Fig. 1, where it is locked. The two clamps for a kerosene-tin or a bucket are applied in the same way as the one described. When an extension-strip N is used, the said strip is slid past the tongues P by placing it in the position shown in Fig. 4. As seen in Fig. 5, the tongues are holding it.

Having now described our invention, what we claim as new, and desire to secure by Letters Patent, is—

1. The improved clamp for handling metallic or other vessels consisting of an upper and lower clamping-bar having upper hooks and lower catches thereon, each meeting end of which bars has a tongue and a pocket and a side stop, each meeting end having also a pivot-pin therein pivoted to a fastening-lever, said fastening-lever having a finger-piece thereon and retained against the upper clamping-bar by a stop, in combination with a handle, the lower portion of which is attached to the lower clamping-bar and upper portion of which has a thumb-piece thereon, all as and for the purposes hereinbefore described and as illustrated in the drawings.

2. The improved clamp for handling metallic or other vessels, such as kerosene-tins or buckets consisting of an upper and lower clamping-bar, a hook or hooks on the upper portion of the upper bar and a catch or catches on the lower portion of the lower bar, a tongue and pocket and side stop at each meeting end of the said clamping-bars, pivot-pins through said meeting ends also passing through a fastening-lever held by a stop on the upper bar, an extension near the top of said upper bar having a hole therethrough, all as and for the purposes hereinbefore described and as illustrated in the drawings.

3. The improved clamp for handling metallic or other vessels such as kerosene-tins or buckets consisting of an upper and a lower clamping-bar, a tongue, a pocket, and a stop near the meeting ends of each of the said clamping-bars, a pivot-pin passing through each meeting end and through a fastening-lever, said fastening-lever being held by a stop, a hook or hooks near the top of the said outer clamping-bar, an extension containing a hole above the top of the upper clamping-bar, a slot near the bottom of the lower clamping-bar through which passes an extension-strip having teeth each side of the same engaging with retaining-tongues protruding from the lower clamping-bar, said extension-strip having a holding-tongue near its top and on its bottom catches all as and for the purposes hereinbefore described and as illustrated in the drawings.

4. The improved clamp for handling metallic or other vessels consisting of an upper and a lower clamping-bar the upper and lower end of which are united by a handle, and each meeting end has a tongue or pocket, a side stop, pivot-pins passing through said meeting ends and through a fastening-lever, said fastening-lever being locked by a stop, hooks near the top of the upper clamping-bar, a slot through the junction of the lower clamping-bar and the handle, an extension-strip passing through said slot having teeth on its sides engaging with retaining-tongues protruding from the lower clamping-bar, said strip retained in place by a holding-tongue near its top and at its bottom having catches, all as and for the purposes hereinbefore described and as illustrated in the drawings.

In witness whereof we have hereunto set our hands to this specification in the presence of two witnesses.

SYDNEY ERNEST LOVE.
WILLIAM JOHN McRAE.

Witnesses to Sydney Ernest Love's signature:

CHARLES FREDERICK STRAUSS,
JAMES LAW DARROCH.

Witnesses to William John McRae's signature:

EDWIN PHILLIPS,
CECIL W. LE PLASTRIER,
GEORGE A. U'REN.